(12) United States Patent
Hirota et al.

(10) Patent No.: US 12,337,754 B2
(45) Date of Patent: Jun. 24, 2025

(54) LIGHT ILLUMINATOR AND STEERING DEVICE

(71) Applicant: TOYODA GOSEI CO., LTD., Kiyosu (JP)

(72) Inventors: Itsuhiko Hirota, Kiyosu (JP); Masaaki Mori, Kiyosu (JP); Akitoshi Naganawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/939,948

(22) Filed: Nov. 7, 2024

(65) Prior Publication Data

US 2025/0162498 A1 May 22, 2025

(51) Int. Cl.
*B60Q 3/283* (2017.01)
*B60Q 3/60* (2017.01)

(52) U.S. Cl.
CPC .............. *B60Q 3/283* (2017.02); *B60Q 3/60* (2017.02)

(58) Field of Classification Search
CPC ................................ B60Q 3/60; B60Q 3/283
USPC ........................................................ 362/488
See application file for complete search history.

(56) References Cited

U.S. PATENT DOCUMENTS

| 4,835,512 | A  | * | 5/1989 | Bratton | ..................... | B60Q 3/14 362/460 |
| 7,866,858 | B2 | * | 1/2011 | Hirzmann | ............... | G09F 13/22 362/487 |
| 8,816,586 | B2 | * | 8/2014 | Marcove | ............... | B60R 13/005 362/183 |
| 9,067,556 | B2 | * | 6/2015 | Bosch | ..................... | B60Q 3/283 |
| 2016/0025281 | A1 | * | 1/2016 | Gardner | ................. | B62D 1/046 362/520 |
| 2022/0306198 | A1 | * | 9/2022 | Sakakibara | ............ | B60K 35/60 |

FOREIGN PATENT DOCUMENTS

JP 2018-111440 A 7/2018

* cited by examiner

*Primary Examiner* — Thomas M Sember
(74) *Attorney, Agent, or Firm* — Posz Law Group, PLC

(57) ABSTRACT

A housing unit doesn't include a configuration for fixing a lens cover and includes a housing contact part contacting the lens cover with respect to the reference direction. The lens cover doesn't include a configuration for fixing a lens mount and includes a lens cover contact part contacting the lens mount. The lens mount doesn't include a configuration for fixing a substrate and includes a lens mount contact part contacting the substrate. The substrate doesn't include a configuration for fixing a bottom wall unit and includes a substrate contact part contacting the bottom wall unit. The housing unit includes a housing engagement part. The bottom wall unit includes a bottom wall engagement part. The engagement between the housing engagement part and the bottom wall engagement part fixes the housing unit and the bottom wall unit relative to each other with respect to the reference direction.

4 Claims, 16 Drawing Sheets

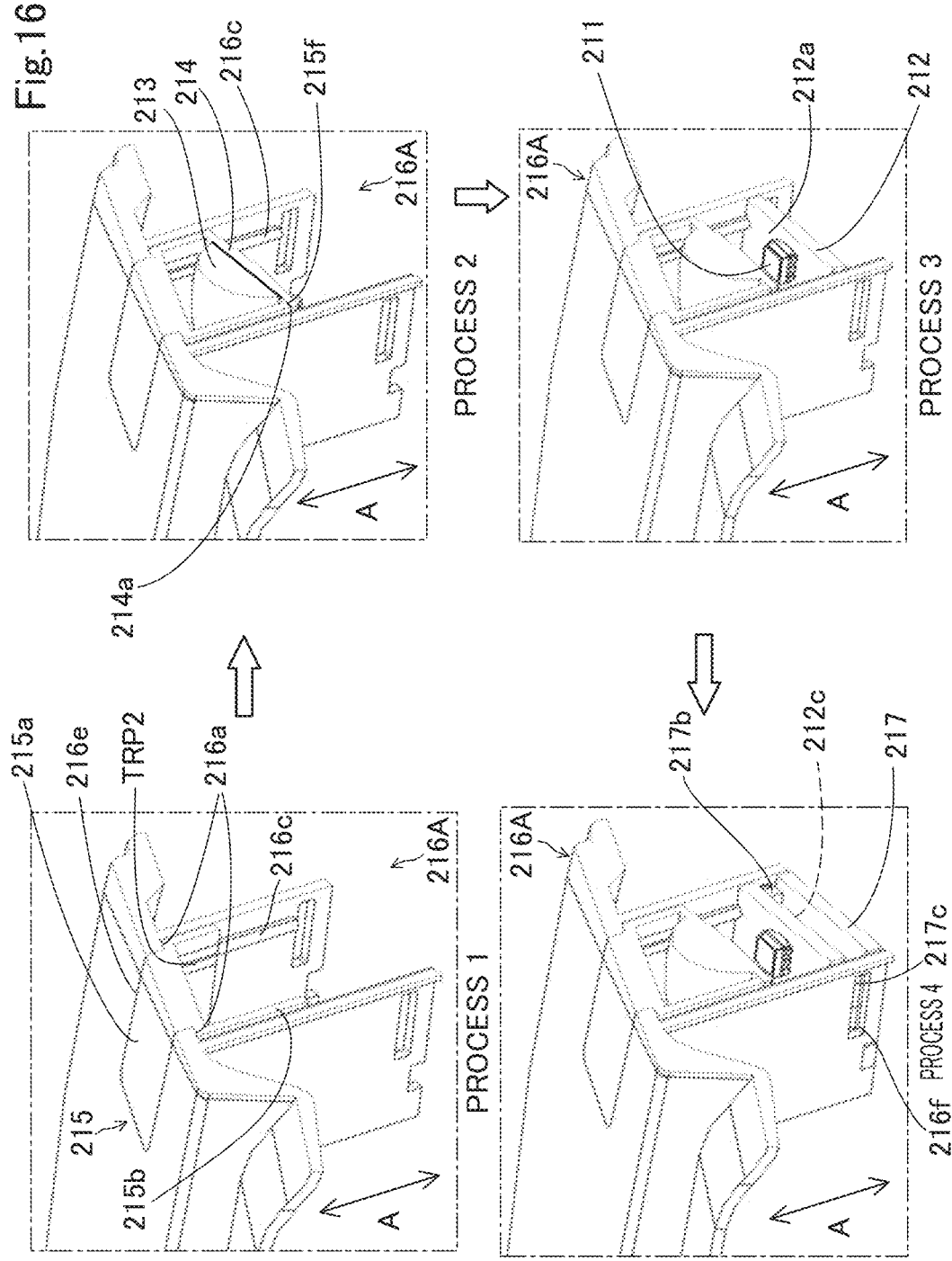

LIGHT ILLUMINATOR AND STEERING DEVICE

CROSS REFERENCE TO RELATED APPLICATIONS

The present application claims the priority based on Japanese Patent Application No. 2023-194797 filed on Nov. 16, 2023, the disclosure of which is hereby incorporated by reference in its entirety.

BACKGROUND

Field

The present disclosure relates to a light illuminator and a steering device.

Related Art

Japanese Patent Application Publication No. 2018-111440 discloses a steering wheel illumination device that emits visible light to a wheel of a steering of a vehicle using light-emitting parts mounted on a pad part and a spoke part of the steering. An LED is used as a light-emitting element of the light-emitting part.

Generally, a light-emitting part is composed of a plurality of components such as a light-emitting element, a substrate mounted with the light-emitting element, a lens that passes light therethrough having been emitted from the light-emitting element, a lens cover for protecting the lens, a case for protecting the light-emitting element, the substrate, the lens, and the lens cover. In some cases, these components are connected to each other by engagement. According to Patent Literature 1, an exposed part of the case of the light-emitting part may have a shape conforming to the shape of the pad part or that of the spoke part to which the light-emitting part is attached. In this case, in replacing the light-emitting element, the operator is required to disengage the connection between the substrate, the lens, the lens cover, and the case in order to reuse components other than the light-emitting element and the substrate. An operator not experienced in replacing the light-emitting part may damage the light-emitting part or increase operation time.

SUMMARY

The present disclosure is feasible in the following aspects.

According to one aspect of the present disclosure, a light illuminator provided in a steering device is provided. The light illuminator comprises: a light-emitting element that emits light to a gripping part of the steering device; a substrate supporting the light-emitting element; a lens that converges the light emitted from the light-emitting element; a lens mount on which the lens is placed; a lens cover that transmits the light therethrough having been passed through the lens; a housing unit that houses the light-emitting element, the substrate, the lens, the lens mount, and the lens cover, the housing unit having an opening at one end portion thereof; and a bottom wall unit configured to be attachable to and detachable from the housing unit, the bottom wall unit closing at least a part of the one end portion of the housing unit while the bottom wall unit is attached to the housing unit. The housing unit does not include a configuration for fixing the position of the lens cover with respect to a predetermined reference direction and includes a housing contact part contacting the lens cover with respect to the reference direction. The lens cover does not include a configuration for fixing the position of the lens mount with respect to the reference direction and includes a lens cover contact part contacting the lens mount with respect to the reference direction. The lens mount does not include a configuration for fixing the position of the substrate with respect to the reference direction and includes a lens mount contact part contacting the substrate with respect to the reference direction. The substrate does not include a configuration for fixing the position of the bottom wall unit with respect to the reference direction and includes a substrate contact part contacting the bottom wall unit with respect to the reference direction. The housing unit includes a housing engagement part formed closer to the one end portion than the other end portion thereof. The bottom wall unit includes a bottom wall engagement part engaged with the housing engagement part. The engagement between the housing engagement part and the bottom wall engagement part fixes the positions of the housing unit and the bottom wall unit relative to each other with respect to the reference direction.

BRIEF DESCRIPTION OF THE DRAWINGS

FIG. 16 is a view showing processes of assembling of the light illuminator.

DETAILED DESCRIPTION

A. First Embodiment

A1. Configuration of First Embodiment

Figure 1:
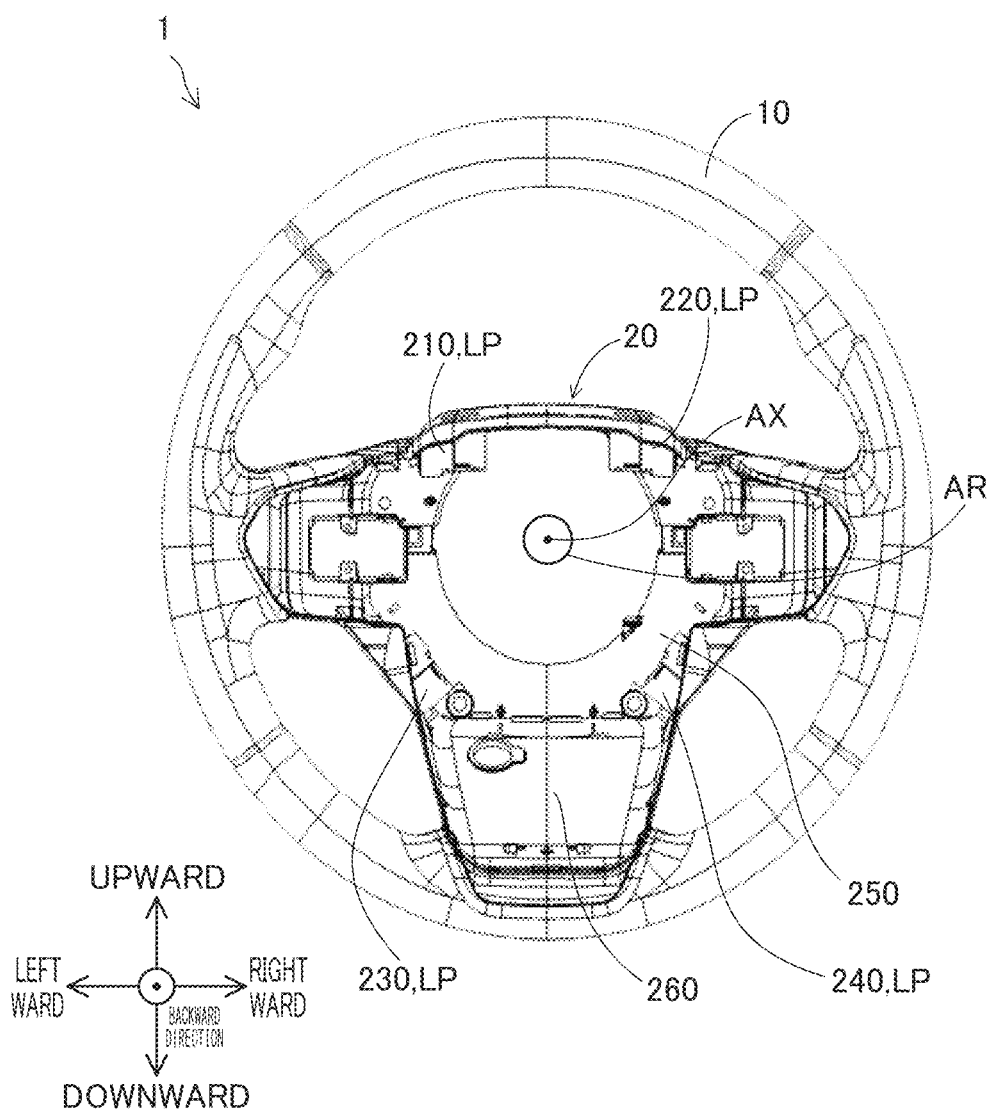
FIG. 1 is a schematic view of a steering device according to a present embodiment.

FIG. 1 is a schematic view of a steering device 1 according to a present embodiment. The steering device 1 is provided in a moving object. In the present embodiment, the steering device 1 is provided in a vehicle not shown in the drawings. The steering device 1 is a device to be operated by a driver who is a passenger of the vehicle. The steering device 1 is coupled to a rotary axis AR of the vehicle and is configured to be operable to rotate about an axis line AX of the rotary axis AR. In FIG. 1, the rotary axis AR and the steering device 1 seem not to be coupled to each other. However, a fixing unit of the steering device 1 not shown in the drawings and the rotary axis AR are coupled to each other and the fixing unit is coupled to a gripping part 10 and a rotary part 20 described later. The rotation of the steering device 1 is transmitted via the rotary axis AR to a steering gear box not shown in the drawings. For the sake of convenience, a direction along the axis line AX of the rotary axis AR is denoted as a forward-backward direction. The forward-backward direction of the vehicle and the direction along the axis line AX of the rotary axis AR do not agree with each other. Of directions perpendicular to the axis line AX, a direction conforming to a rightward-leftward direction of the vehicle is denoted as a rightward-leftward direction. A direction perpendicular to the axis line AX and to the rightward-leftward direction is dented as an upward-downward direction for the sake of convenience. The upward-downward direction of the vehicle and the direction perpendicular to the axis line AX and to the rightward-leftward direction do not agree with each other. In FIG. 1, the steering device 1 is in a state of not rotating. The steering device 1 includes the gripping part 10 and the rotary part 20.

The gripping part 10 is a part to be gripped by a driver. In the present embodiment, the gripping part 10 has a substantially ring-like shape when viewed in the forward-backward direction. The gripping part 10 is connected to the rotary part 20 on an inner peripheral side of the gripping part 10. The gripping part 10 covers a part of the rotary part 20. In this way, the gripping part 10 becomes connected to the rotary part 20.

Figure 2:
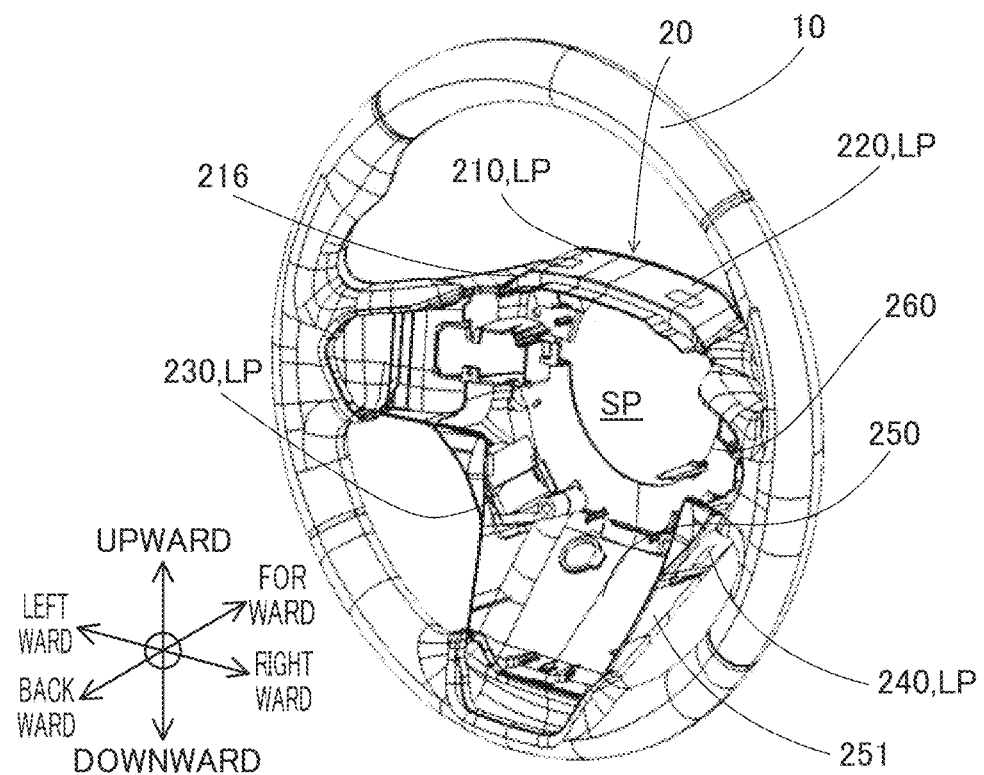
FIG. 2 is a view explaining a rotary part.

FIG. 2 is a view explaining the rotary part 20. The rotary part 20 is rotatably attached to the vehicle. The rotary part 20 is connected to the above-described fixing unit not shown in the drawings. By doing so, when the fixing unit connected to the gripping part 10 rotates, the rotary part 20 rotates in conjunction with the fixing unit. As shown in FIG. 2, the rotary part 20 has a shape projecting toward a forward direction. As shown in FIGS. 1 and 2, the rotary part 20 includes a first light illuminator 210, a second light illuminator 220, a third light illuminator 230, a fourth light illuminator 240, a rotary case unit 250, a rotary hole part 260, and housing space SP. In the following, if the first light illuminator 210 to the fourth light illuminator 240 are described without being distinguished from each other, they will be denoted as a "light illuminator LP."

Figure 3:
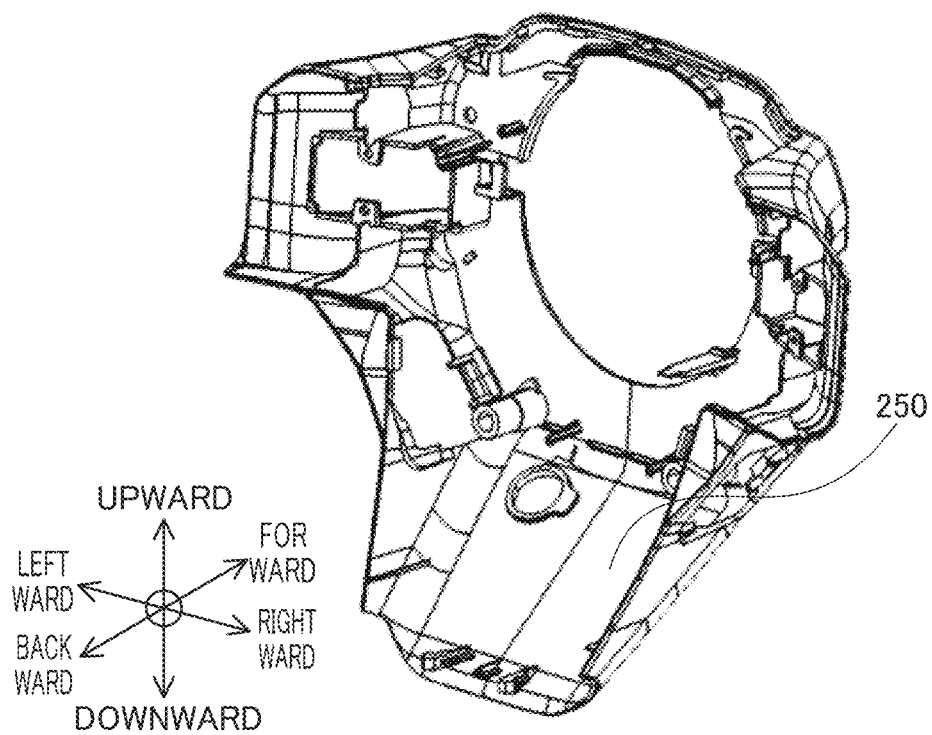
FIG. 3 is a view showing only a rotary case unit.
Figure 4:
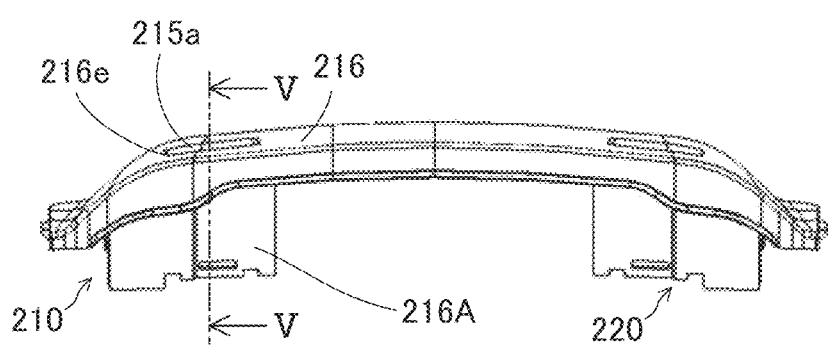
FIG. 4 is a view explaining a first light illuminator and a second light illuminator.

FIG. 3 is a view showing only the rotary case unit 250. FIG. 4 is a view explaining the first light illuminator 210 and the second light illuminator 220. The light illuminator LP shown in FIG. 1 emits light toward the gripping part 10. As shown in FIG. 2, in the present embodiment, the light illuminator LP forms a surface continuous with an outer surface 251 belonging to a surface of the rotary case unit 250 and a part of which is facing the gripping part 10. The light illuminator LP is configured to be attachable to and detachable from the rotary case unit 250. The attachment and detachment of the light illuminator LP to and from the rotary case unit 250 will be described later.

Figure 5:
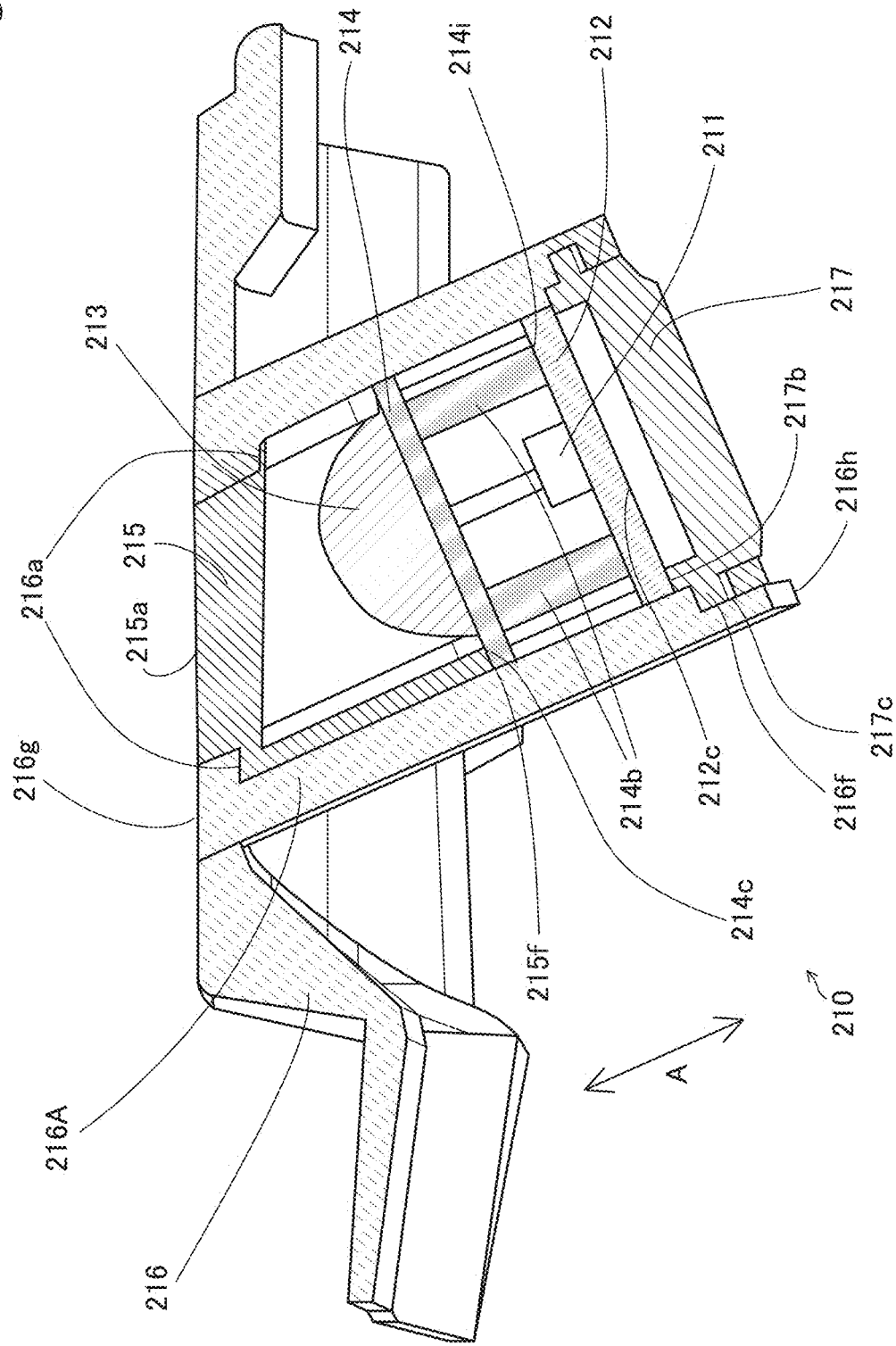
FIG. 5 is a sectional view along V-V in FIG. 4.

FIG. 5 is a sectional view along V-V in FIG. 4. In the present embodiment, the first light illuminator 210 to the fourth light illuminator 240 have configurations similar to each other. The first light illuminator 210, the second light illuminator 220, the third light illuminator 230, and the fourth light illuminator 240 emit light toward different regions of the gripping part 10. In the following, a configuration common to the light illuminators LP will be shown by describing the configuration of the first light illuminator 210. As shown in FIG. 5, the first light illuminator 210 includes a light-emitting element 211, a substrate 212, a lens 213, a lens mount 214, a lens cover 215, a cover 216, a bottom wall unit 217, and a connector 218 not shown in FIG. 5.

In the present specification, a direction in which the lens cover 215, the lens 213, the lens mount 214, the light-emitting element 211, the substrate 212, and the bottom wall unit 217 are juxtaposed in this order is denoted as a "predetermined reference direction" or a "reference direction." The reference direction is represented by a double-headed arrow A in FIG. 5. The reference direction shown in FIG. 5 is also a direction of assembling the first light illuminator 210. The first light illuminator 210 is assembled by an operator by following the reference direction. The assembling will be described later. The light-emitting element 211, the substrate 212, the lens 213, the lens mount 214, the bottom wall unit 217, and the connector 218 are structures common to the light illuminators LP. A structure differing between the first light illuminator 210 to the fourth light illuminator 240 will be described later.

Figure 6:
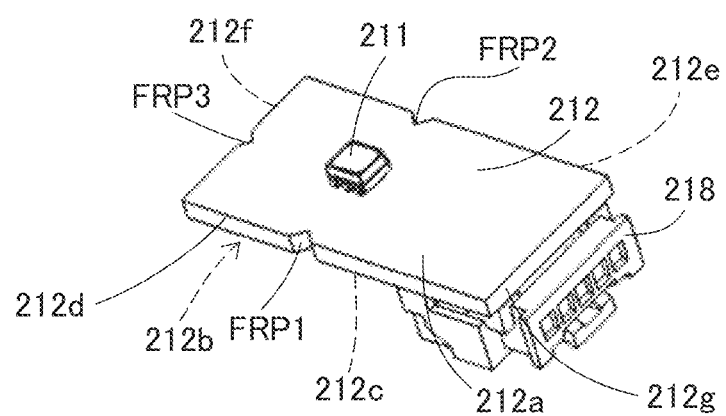
FIG. 6 is a view showing a light-emitting element, a substrate, and a connector.

FIG. 6 is a view showing the light-emitting element 211, the substrate 212, and the connector 218. The light-emitting element 211 shown in FIG. 6 emits light to the gripping part 10. In the present embodiment, a light-emitting diode is used as the light-emitting element 211. The substrate 212 supports the light-emitting element 211. In the present embodiment, the substrate 212 is a printed board. The substrate 212 includes a substrate front surface 212a, a substrate rear surface 212b, a first substrate side surface 212d, a second substrate side surface 212e, a third substrate side surface 212f, a fourth substrate side surface 212g, and first rail receivers FRP1, FRP2, and FRP3.

The substrate front surface 212a is a surface of the substrate 212 on which the light-emitting element 211 is placed. The substrate rear surface 212b is a surface facing the substrate front surface 212a. A part of the substrate rear surface 212b contacts the bottom wall unit 217 described later with respect to the reference direction. In the following, the part of the substrate rear surface 212b contacting the bottom wall unit 217 will also be denoted as a "substrate contact part 212c." The other part of the substrate rear surface 212b contacts the connector 218. In the present specification, contact between an object A and an object B with respect to the reference direction means that, when viewed in the reference direction, the object A and the object B contact each other while being juxtaposed in the reference direction. In the present embodiment, when viewed in the reference direction, the substrate contact part 212c and the bottom wall unit 217 are juxtaposed in the reference direction, as shown in FIG. 5.

As shown in FIG. 6, the first substrate side surface 212d, the second substrate side surface 212e, the third substrate side surface 212f, and the fourth substrate side surface 212g are four surfaces forming connection between the substrate front surface 212a and the substrate rear surface 212b. The first substrate side surface 212d is a surface extending in a lengthwise direction of the substrate 212. The second substrate side surface 212e faces the first substrate side surface 212d. The third substrate side surface 212f is a surface extending in a short-side direction of the substrate 212. The fourth substrate side surface 212g faces the third substrate side surface 212f.

The first rail receiver FRP1 is a groove formed in a direction parallel to a contact direction as a predetermined direction. The contact direction will be described later. The first rail receiver FRP1 extends over the substrate front surface 212a, the substrate rear surface 212b, and the first substrate side surface 212d. When viewed in the contact direction, the first rail receiver FRP1 is formed into a triangular shape. The first rail receiver FRP2 is a groove formed in a direction parallel to the contact direction. The first rail receiver FRP2 extends over the substrate front surface 212a, the substrate rear surface 212b, and the second substrate side surface 212*e*. When viewed in the contact direction, the first rail receiver FRP2 is formed into a triangular shape. The first rail receiver FRP3 is a groove formed in a direction parallel to the contact direction. The first rail receiver FRP3 extends over the substrate front surface 212*a*, the substrate rear surface 212*b*, and the third substrate side surface 212*f*. When viewed in the contact direction, the first rail receiver FRP3 is formed into a triangular shape. The functions of the first rail receivers FRP1, FRP2, and FRP3 will be described later.

Figure 7:
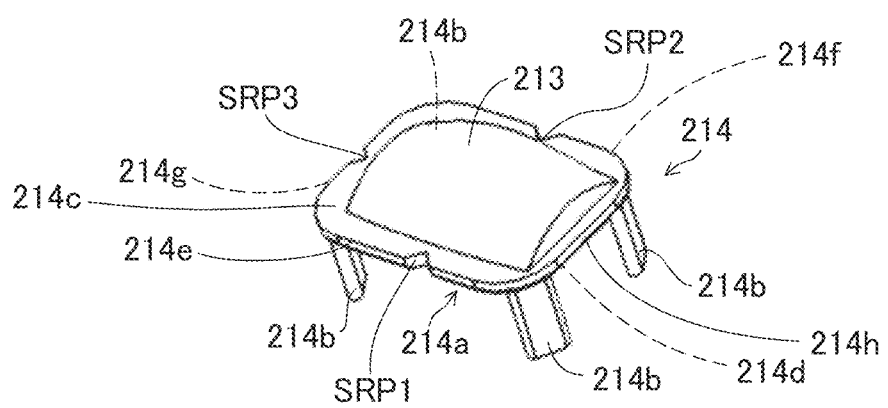
FIG. 7 is a view showing a lens and a lens mount.

FIG. 7 is a view showing the lens 213 and the lens mount 214. The lens 213 converges light emitted from the light-emitting element 211. The lens 213 concentrates the light emitted from the light-emitting element 211, thereby making the light enter the gripping part 10 efficiently. In the present embodiment, the optical axis of the light emitted from the light-emitting element 211 is parallel to the reference direction. The lens mount 214 is a mount on which the lens 213 is placed. The lens mount 214 includes a mount 214*a*, four legs 214*b*, a mount front surface 214*c*, a mount rear surface 214*d*, a first mount side surface 214*e*, a second mount side surface 214*f*, a third mount side surface 214*g*, and a fourth mount side surface 214*h*.

The mount 214*a* is a part on which the lens 213 is placed. The mount 214*a* is a plate-like member for passing light therethrough. The mount front surface 214*c* is a surface of the mount 214*a* on which the lens 213 is placed. The mount rear surface 214*d* is a surface facing the mount front surface 214*c*. The four legs 214*b* are attached to the mount rear surface 214*d*.

The first mount side surface 214*e*, the second mount side surface 214*f*, the third mount side surface 214*g*, and the fourth mount side surface 214*h* are four surfaces forming connection between the mount front surface 214*c* and the mount rear surface 214*d*. The first mount side surface 214*e* is a surface extending in a lengthwise direction of the mount 214*a*. The second mount side surface 214*f* faces the first mount side surface 214*e*. The third mount side surface 214*g* is a surface extending in a short-side direction of the mount 214*a*. The fourth mount side surface 214*h* faces the third mount side surface 214*g*.

A second rail receiver SRP1 is a groove formed in a direction parallel to the contact direction. The second rail receiver SRP1 extends over the mount front surface 214*c*, the mount rear surface 214*d*, and the first mount side surface 214*e*. When viewed in the contact direction, the second rail receiver SRP1 is formed into a triangular shape. A second rail receiver SRP2 is a groove formed in a direction parallel to the contact direction. The second rail receiver SRP2 extends over the mount front surface 214*c*, the mount rear surface 214*d*, and the second mount side surface 214*f*. When viewed in the contact direction, the second rail receiver SRP2 is formed into a triangular shape. A second rail receiver SRP3 is a groove formed in a direction parallel to the contact direction. The second rail receiver SRP3 extends over the mount front surface 214*c*, the mount rear surface 214*d*, and the third mount side surface 214*g*. When viewed in the contact direction, the second rail receiver SRP3 is formed into a triangular shape. The functions of the second rail receivers SRP1, SRP2, and SRP3 will be described later.

As shown in FIG. 5, the leg 214*b* is a part contacting the substrate 212. Each of the four legs 214*b* has a substantially rectangular solid shape. In the present embodiment, a surface of the leg 214*b* contacting the substrate front surface 212*a* of the substrate 212 with respect to the reference direction is also denoted as a "lens mount contact part 214*i*."

Figure 8:
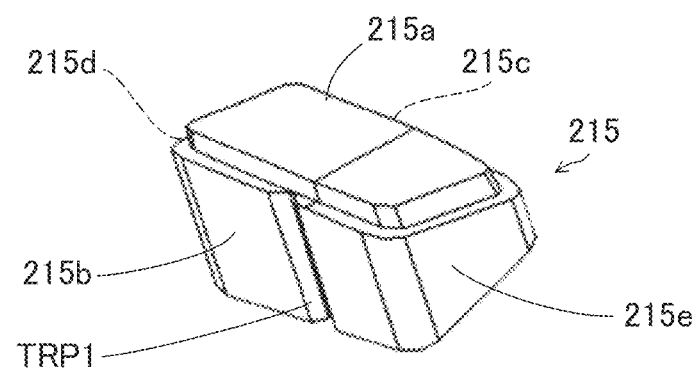
FIG. 8 is a view explaining a lens cover.
Figure 9:
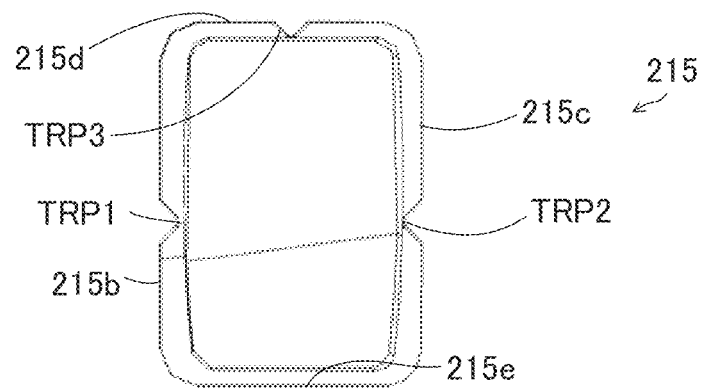
FIG. 9 is a view corresponding to FIG. 8 taken from a different direction.

FIG. 8 is a view explaining the lens cover 215. FIG. 9 is a view corresponding to FIG. 8 taken from a different direction. The lens cover 215 transmits light therethrough having been passed through the lens 213. The lens cover 215 is capable of preventing external light from coming into the lens 213. The lens cover 215 is also capable of protecting the lens 213 from dust or water droplets. As shown in FIGS. 5 and 8, the lens cover 215 is a box-shaped member having an opening at one end portion thereof. The lens 213 is arranged inside the lens cover 215. The lens cover 215 is made of a material that transmits light therethrough. As shown in FIG. 8, the lens cover 215 includes a lens cover front wall 215*a*, a first lens cover side wall 215*b*, a second lens cover side wall 215*c*, a third lens cover side wall 215*d*, and a fourth lens cover side wall 215*e*.

The lens cover front wall 215*a* forms an end portion of the lens cover 215. In the following, the end portion formed of the lens cover front wall 215*a* will be denoted as the other end portion of the lens cover 215. As shown in FIG. 5, a part of the lens cover front wall 215*a* is exposed to the outside of the first light illuminator 210. As shown in FIG. 8, the first lens cover side wall 215*b*, the second lens cover side wall 215*c*, the third lens cover side wall 215*d*, and the fourth lens cover side wall 215*e* are wall parts connected to the lens cover front wall 215*a*. Each of the first lens cover side wall 215*b*, the second lens cover side wall 215*c*, the third lens cover side wall 215*d*, and the fourth lens cover side wall 215*e* has end portions, and of these portions, an end portion on a side not connected to the lens cover front wall 215*a* forms one end portion of the lens cover 215. As shown in FIG. 5, the lens cover 215 contacts the mount front surface 214*c* of the mount 214*a* of the lens mount 214 at the other end portion thereof with respect to the reference direction. A part of the other end portion of the lens cover 215 contacting the mount front surface 214*c* is also denoted as a "lens cover contact part 215*f*."

As shown in FIGS. 8 and 9, the first lens cover side wall 215*b* is provided with a third rail receiver TRP1 that is a groove formed in a direction parallel to the contact direction. When viewed in the contact direction, the third rail receiver TRP1 is formed into a triangular shape. The second lens cover side wall 215*c* faces the first lens cover side wall 215*b*. The second lens cover side wall 215*c* is provided with a third rail receiver TRP2 that is a groove formed in a direction parallel to the contact direction. When viewed in the contact direction, the third rail receiver TRP2 is formed into a triangular shape. The third lens cover side wall 215*d* is provided with a third rail receiver TRP3 that is a groove formed in a direction parallel to the contact direction. When viewed in the contact direction, the third rail receiver TRP3 is formed into a triangular shape. The functions of the third rail receivers TRP1, TRP2, and TRP3 will be described later. The fourth lens cover side wall 215*e* faces the third lens cover side wall 215*d*.

As shown in FIG. 5, the cover 216 houses the light-emitting element 211, the substrate 212, the lens 213, the lens mount 214, and the lens cover 215. As shown in FIG. 2, the cover 216 defines an outer shape of the rotary part 20 together with the rotary case unit 250. In the present embodiment, the cover 216 is engaged with the rotary case unit 250 to define the outer shape of the rotary part 20. As shown in FIG. 4, the cover 216 includes a housing unit 216A.

Figure 10:
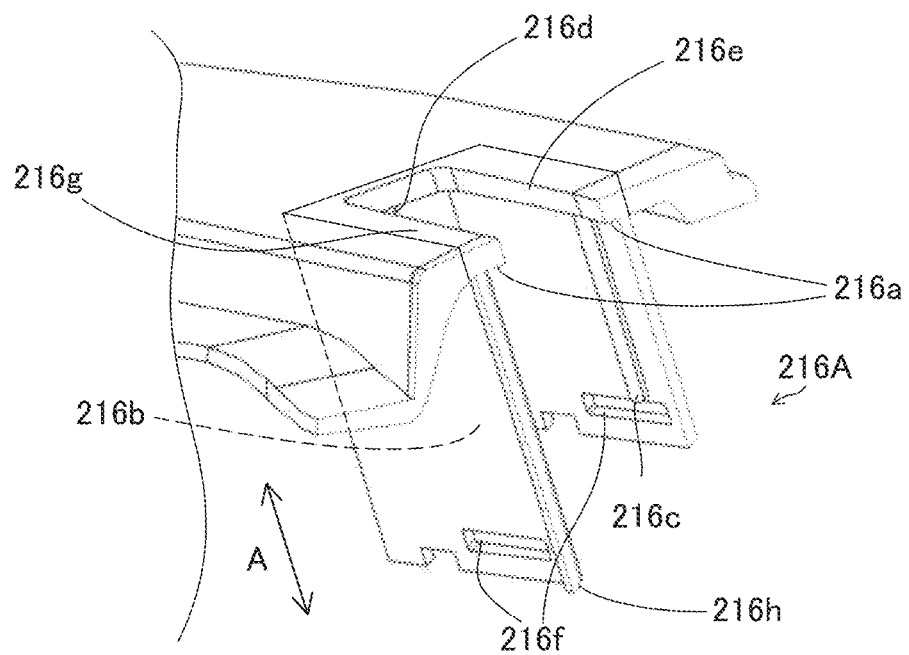
FIG. 10 is a view explaining a housing unit.

FIG. 10 is a view explaining the housing unit 216A. The light-emitting element 211, the substrate 212, the lens 213, the lens mount 214, the lens cover 215, and the bottom wall unit 217 are omitted from FIG. 10. The housing unit 216A houses the light-emitting element 211, the substrate 212, the lens 213, the lens mount 214, and the lens cover 215. The housing unit 216A is a part forming a part of the cover 216. In FIG. 10, for the sake of convenience, the housing unit 216A is illustrated with solid lines. As shown in FIG. 5, the housing unit 216A has a box shape with an opening at a part of each of one end portion 216h and the other end portion 216g thereof. While the bottom wall unit 217 is attached to the housing unit 216A, a part of the opening at the one end portion 216h of the housing unit 216A is closed by the bottom wall unit 217. As shown in FIG. 10, the housing unit 216A includes a housing contact part 216a, a first rail part 216b, a second rail part 216c, a third rail part 216d, a housing hole part 216e, and a housing engagement part 216f.

As shown in FIG. 5, the housing contact part 216a is a part contacting the lens cover 215 with respect to the reference direction. In the present embodiment, the housing contact part 216a contacts respective parts of the first lens cover side wall 215b to the fourth lens cover side wall 215e of the lens cover 215. The first rail part 216b is received by the first rail receiver FRP1, the second rail receiver SRP1, and the third rail receiver TRP1. The first rail part 216b has a shape projecting from an inner wall of the housing unit 216A. The first rail part 216b extends in the contact direction that is a direction from the other end portion 216g toward the one end portion 216h of the housing unit 216A. In the present embodiment, the contact direction is parallel to the reference direction and to the optical axis of light emitted from the light-emitting element 211 (see the double-headed arrow A in FIG. 10). The first rail part 216b has a substantially rectangular solid shape. The second rail part 216c is received by the first rail receiver FRP2, the second rail receiver SRP2, and the third rail receiver TRP2. The second rail part 216c has the same configuration as the first rail part 216b. The second rail part 216c faces the first rail part 216b. The third rail part 216d is received by the first rail receiver FRP3, the second rail receiver SRP3, and the third rail receiver TRP3. The third rail part 216d has the same configuration as the first rail part 216b. The receptions of the first rail part 216b to the third rail part 216d will be described later.

As shown in FIG. 4, the housing hole part 216e forms a hole where the lens cover front wall 215a of the lens cover 215 is arranged. As shown in FIG. 10, the housing hole part 216e is formed at the other end portion 216g of the housing unit 216A. The housing hole part 216e forms an opening at a part of the other end portion 216g of the housing unit 216A. The housing engagement part 216f is a part engaged with a bottom wall engagement part 217c of the bottom wall unit 217. The bottom wall engagement part 217c will be described later. The housing engagement part 216f is formed closer to the one end portion 216h than the other end portion 216g of the housing unit 216A. In the present embodiment, the housing engagement part 216f forms a hole for fitting the bottom wall engagement part 217c therein.

Figure 11:
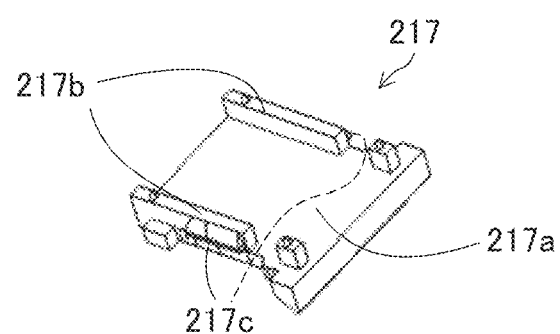
FIG. 11 is a view showing a bottom wall unit.
Figure 12:
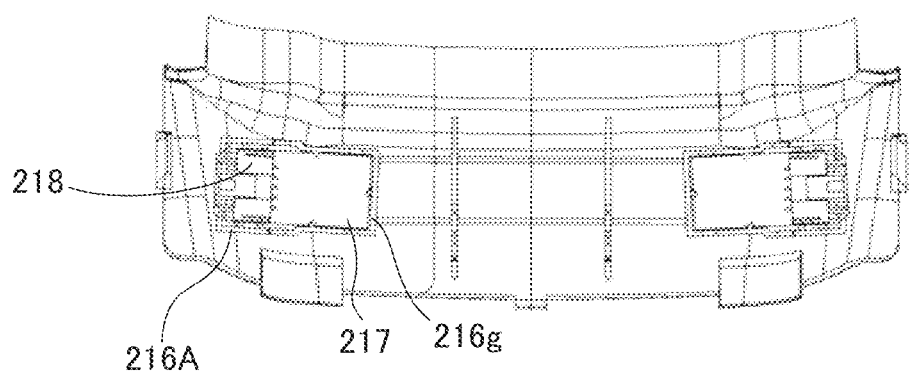
FIG. 12 is a view for explaining that the bottom wall unit closes one end portion of the housing unit.

FIG. 11 is a view showing the bottom wall unit 217. FIG. 12 is a view for explaining that the bottom wall unit 217 closes the one end portion 216h of the housing unit 216A. The bottom wall unit 217 is configured to be attachable to and detachable from the housing unit 216A. As shown in FIG. 12, while the bottom wall unit 217 is attached to the housing unit 216A, the bottom wall unit 217 closes a part of the opening at the one end portion 216h of the housing unit 216A. As shown in FIG. 11, the bottom wall unit 217 includes a bottom wall plate part 217a, a bottom wall contact part 217b, and the bottom wall engagement part 217c. The bottom wall plate part 217a is a plate-like member from which the bottom wall contact part 217b and the bottom wall engagement part 217c project. The bottom wall unit 217 is configured in such a manner that, when an operator connects a cable not shown in the drawings to the connector 218, an end portion of the bottom wall plate part 217a comes into contact with the cable. The operator is capable of identifying the position of the cable by the contact of the end portion of the bottom wall plate part 217a with the cable. As shown in FIG. 5, the bottom wall contact part 217b is a part contacting the substrate contact part 212c of the substrate 212. The bottom wall engagement part 217c shown in FIG. 11 is a part engaged with the housing engagement part 216f of the housing unit 216A. In the present embodiment, the bottom wall engagement part 217c is a projection projecting from the bottom wall contact part 217b. As shown in FIG. 5, the bottom wall engagement part 217c is fitted in the housing engagement part 216f, thereby fixing the position of the bottom wall engagement part 217c. The engagement of the bottom wall engagement part 217c with the housing engagement part 216f fixes the positions of the housing unit 216A and the bottom wall unit 217 relative to each other with respect to the reference direction.

The connector 218 shown in FIG. 6 is a component for connecting the light-emitting element 211 electrically to a controller of the steering device 1 not shown in the drawings. The connector 218 is attached to the substrate rear surface 212b of the substrate 212. While not shown in the drawings, the connector 218 is connected to the cable.

The second light illuminator 220 shown in FIG. 1 has the same function as the first light illuminator 210. The second light illuminator 220 is configured in such a manner that, while the steering device 1 is in a state of not rotating as shown in FIG. 1, the second light illuminator 220 is symmetric to the first light illuminator 210 with respect to a plane including the upward-downward direction and the forward-backward direction. The second light illuminator 220 is engaged with the first light illuminator 210. While the first light illuminator 210 is engaged with the second light illuminator 220, the second light illuminator 220 is attached to the rotary case unit 250.

Figure 13:
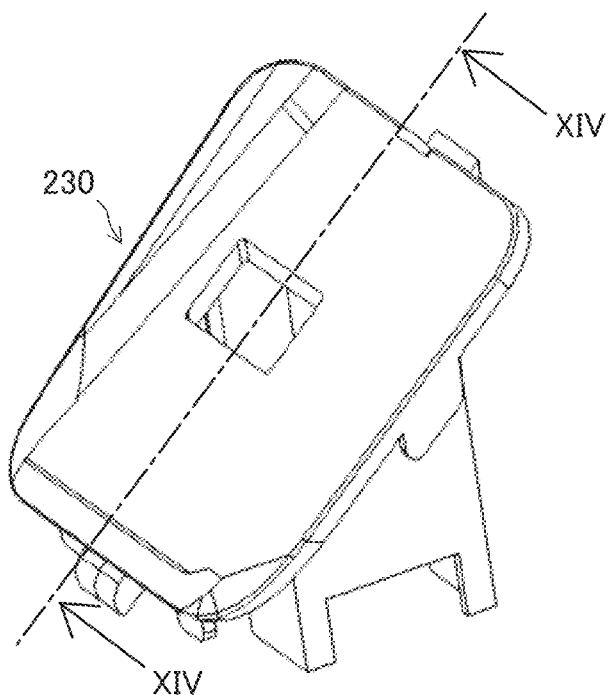
FIG. 13 is a view explaining a third light illuminator.
Figure 14:
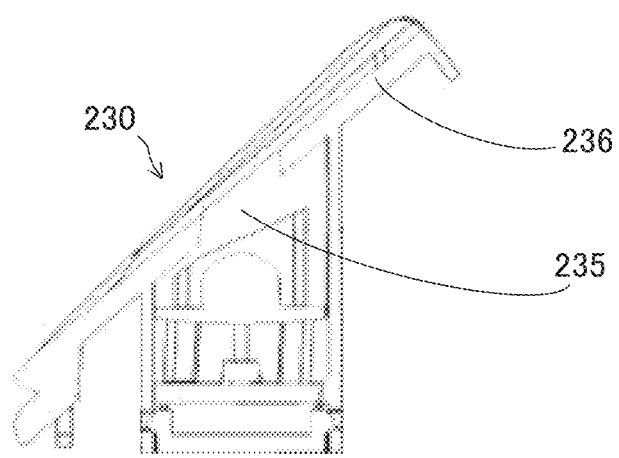
FIG. 14 is a sectional view along XIV-XIV in FIG. 13.

FIG. 13 is a view explaining the third light illuminator 230. FIG. 14 is a sectional view along XIV-XIV in FIG. 13. Hatching is omitted from FIG. 14. As shown in FIGS. 5 and 14, the third light illuminator 230 includes a cover 236 and a lens cover 235 having different shapes from those of the first light illuminator 210. The functions of the cover 236 and the lens cover 235 are the same as those of the first light illuminator 210. The fourth light illuminator 240 has the same shape as the third light illuminator 230. A reference direction about each of the second light illuminator 220 to the fourth light illuminator 240 is different from the above-described reference direction about the first light illuminator 210 shown in FIG. 5. The reference direction about each of the second light illuminator 220 to the fourth light illuminator 240 is a direction in which a lens cover, a lens, a lens mount, a light-emitting element, a substrate, and a bottom wall unit of each of the second light illuminator 220 to the fourth light illuminator 240 are juxtaposed in this order. In the present embodiment, the reference direction about each of the second light illuminator 220 to the fourth light illuminator 240 is parallel to the optical axis of light emitted from a corresponding light-emitting element.

The rotary case unit 250 shown in FIG. 1 defines the outer shape of the rotary part 20 together with the light illuminator LP. The rotary case unit 250 is engaged with the light illuminator LP. The rotary hole part 260 forms a hole for passing the rotary axis AR therethrough. The housing space SP houses a part of the light illuminator LP, an ECU for controlling the steering device 1, an airbag, and others. The parts such as the ECU and the airbag are not shown in the drawings.

A2. Description of Assembling of Light Illuminator LP

Figure 15:
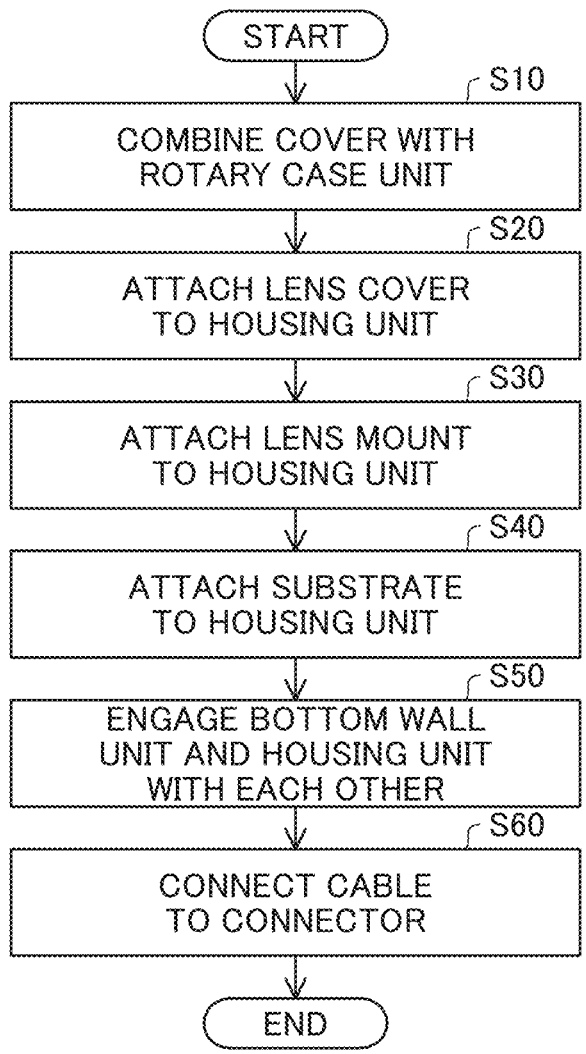
FIG. 15 is an exemplary flowchart explaining assembling of a light illuminator.

FIG. 15 is an exemplary flowchart explaining assembling of the light illuminator LP. FIG. 16 is a view showing processes of assembling of the light illuminator LP. Sections in FIG. 16 correspond to FIG. 10. Hatching is omitted from FIG. 16. The light illuminator LP is assembled by an operator. In step S10 in FIG. 15, the cover 216 is engaged with the rotary case unit 250, thereby combining the cover 216 with the rotary case unit 250. The illustration of the rotary case unit 250 is omitted from FIG. 16. As shown in process 1 in FIG. 16, in step S20 in FIG. 15, the lens cover 215 is attached to the housing unit 216A in the reference direction.

In the present embodiment, the third rail receiver TRP1 formed at the first lens cover side wall 215b receives a part of the first rail part 216b of the housing unit 216A. The third rail receiver TRP2 formed at the second lens cover side wall 215c receives a part of the second rail part 216c of the housing unit 216A. FIG. 16 shows only the third rail receiver TRP2 and the second rail part 216c. The third rail receiver TRP3 formed at the third lens cover side wall 215d receives a part of the third rail part 216d of the housing unit 216A. The operator attaches the lens cover 215 to the housing unit 216A in such a manner that the lens cover front wall 215a is arranged in the hole formed at the housing hole part 216e of the housing unit 216A, and that the third rail receivers TRP1 to TRP3 receive the first rail part 216b to the third rail part 216d respectively. In doing this, the operator puts the lens cover 215 into the housing unit 216A until the housing contact part 216a of the housing unit 216A comes into contact with respective parts of the first lens cover side wall 215b to the fourth lens cover side wall 215e of the lens cover 215.

As shown in process 2 in FIG. 16, in step S30 in FIG. 15, the lens mount 214 is attached to the housing unit 216A in the reference direction. By doing so, the lens 213 and the lens mount 214 are housed in the housing unit 216A. As a precondition, the lens 213 is placed in advance on the lens mount 214. In the present embodiment, the second rail receiver SRP1 formed at the lens mount 214 receives a part of the first rail part 216b of the housing unit 216A. The second rail receiver SRP2 receives a part of the second rail part 216c of the housing unit 216A. The second rail receiver SRP3 receives a part of the third rail part 216d of the housing unit 216A. The operator puts the lens mount 214 into the housing unit 216A until the lens cover contact part 215f of the lens cover 215 and the mount 214a of the lens mount 214 come into contact with each other.

As shown in process 3 in FIG. 16, in step S40 in FIG. 15, the substrate 212 is attached to the housing unit 216A. By doing so, the substrate 212, the light-emitting element 211, and the connector 218 not shown in FIG. 16 are housed in the housing unit 216A in the reference direction. As a precondition, the light-emitting element 211 is located in advance at a predetermined position of the substrate 212. In the present embodiment, the first rail receiver FRP1 of the substrate 212 receives a part of the first rail part 216b. The first rail receiver FRP2 receives a part of the second rail part 216c. The first rail receiver FRP3 receives a part of the third rail part 216d. The operator puts the substrate 212 into the housing unit 216A until the substrate front surface 212a of the substrate 212 comes into contact with the lens mount contact part 214i not shown in FIG. 16.

As shown in process 4 in FIG. 16, in step S50 in FIG. 15, the bottom wall unit 217 is attached to the housing unit 216A in the reference direction. In the present embodiment, the bottom wall engagement part 217c is engaged with the housing engagement part 216f, thereby fixing the position of the bottom wall unit 217. At the bottom wall unit 217 attached to the housing unit 216A, the bottom wall contact part 217b contacts the substrate contact part 212c of the substrate 212.

In step S60 in FIG. 15, the cable is connected to the connector 218. The operator connects the cable to the connector 218 in such a manner that the end portion of the bottom wall plate part 217a of the bottom wall unit 217 comes into contact with the cable. The housing unit 216A has a hole formed at a position facing the connector 218 for allowing the cable to be connected to the connector 218.

In disassembling the light illuminator LP, the operator first releases the engagement between the bottom wall unit 217 and the housing unit 216A. The operator moves the substrate 212, the lens mount 214, and the lens cover 215 in a direction conforming to the reference direction of getting away from the housing unit 216A, thereby disassembling the light illuminator LP.

As shown in FIG. 5, while the substrate 212 contacts the bottom wall unit 217 with respect to the reference direction, the substrate 212 does not have a configuration for fixing the position of the bottom wall unit 217. While the lens mount 214 contacts the substrate 212 with respect to the reference direction, the lens mount 214 does not have a configuration for fixing the position of the substrate 212 with respect to the reference direction. While the lens cover 215 contacts the lens mount 214 with respect to the reference direction, the lens cover 215 does not have a configuration for fixing the position of the lens mount 214 with respect to the reference direction. While the housing unit 216A contacts the lens cover 215 with respect to the reference direction, the housing unit 216A does not have a configuration for fixing the position of the lens cover 215 with respect to the reference direction. Thus, release of the engagement between the bottom wall unit 217 and the housing unit 216A by the operator allows the substrate 212, the lens mount 214, and the lens cover 215 to be detached easily from the housing unit 216A.

According to the light illuminator of the present embodiment, the lens cover 215, the lens mount 214, and the substrate 212 are combined sequentially in the reference direction, and then the bottom wall unit 217 and the housing unit 216A are engaged with each other. By doing so, it becomes possible to assemble the light illuminator LP easily without requiring the operator to form engagement or adhesion between the lens cover 215, the lens 213, the lens mount 214, and the substrate 212. Furthermore, in disassembling the light illuminator LP, the operator is capable of disassembling the light illuminator LP into structures easily by releasing the engagement between the bottom wall unit 217 and the housing unit 216A. In comparison to a case where the light illuminator LP is assembled by combining structures including a lens cover through engagement therebetween, for example, it is possible to reduce the probability of damage of the light illuminator LP and to suppress increase in operation time during replacement of the light-emitting element 211.

Furthermore, according to the light illuminator LP of the present embodiment, the first rail part 216b to the third rail part 216d are fitted to the first rail receivers FRP1, FRP2, FRP3 to the third rail receivers TRP1, TRP2, TRP3. This makes it possible to reduce the probability that the positions of the lens cover 215, the mount 214a, and the substrate 212 will be deviated in the housing unit 216A.

Furthermore, according to the light illuminator LP of the present embodiment, the operator is capable of combining the lens cover 215, the lens mount 214, and the substrate 212 along the optical axis of light without causing positional deviations thereof. It is possible to reduce the probability that the light illuminator LP will be combined with the housing unit 216A by the operator with the optical axis deviating from an intended direction.

In the present embodiment, the first rail part 216b to the third rail part 216d have substantially rectangular solid shapes that are quadrangular when viewed in a direction conforming to the contact direction. The first rail receivers FRP1, FRP2, FRP3 to the third rail receivers TRP1, TRP2, TRP3 have triangular shapes. Thus, while respective two corners of the first rail part 216b to the third rail part 216d contact respective oblique sides of the first rail receivers FRP1, FRP2, FRP3 to the third rail receivers TRP1, TRP2, TRP3, the first rail part 216b to the third rail part 216d are received by the first rail receivers FRP1, FRP2, FRP3 to the third rail receivers TRP1, TRP2, TRP3. If the first rail receivers FRP1, FRP2, FRP3 to the third rail receivers TRP1, TRP2, TRP3 have shapes conforming to the shapes of the first rail part 216b to the third rail part 216d when viewed in a direction conforming to the contact direction, for example, the first rail part 216b to the third rail part 216d are received while the first rail part 216b to the third rail part 216d in their entirety contact the first rail receivers FRP1, FRP2, FRP3 to the third rail receivers TRP1, TRP2, TRP3. This makes it impossible to provide stable receptions. In the present embodiment, the first rail part 216b to the third rail part 216d are received while respective two corners thereof contact the first rail receivers FRP1, FRP2, FRP3 to the third rail receivers TRP1, TRP2, TRP3. This allows the operator to combine the lens cover 215, the lens mount 214, and the substrate 212 with the housing unit 216A stably.

In the present embodiment, the first light illuminator 210 and the second light illuminator 220 are attached to the rotary case unit 250 while the first light illuminator 210 and the second light illuminator 220 are engaged with each other. This makes it possible to reduce parting lines, compared to a configuration where the first light illuminator 210 and the second light illuminator 220 are attached separately to the rotary case unit 250. This improves the performance of the steering device 1 in terms of design.

B. Other Embodiments

B1. Other Embodiments 1

(1) In the above-described embodiment, the steering device 1 is provided the four light illuminators LP. The steering device may include light illuminators of a number other than four such as one or five, for example.

(2) In the above-described embodiment, the steering device 1 is mounted on a vehicle. Meanwhile, the steering device may be mounted on a moving object such as a ship or an airplane, for example, other than a vehicle.

(3) In the above-described embodiment, the gripping part 10 has a substantially ring-like shape. The gripping part may have a rectangular shape or a trapezoidal shape when viewed in the forward-backward direction, for example. The gripping part may have a substantially rectangular solid shape surrounding the rotary part, for example.

(4) In the above-described embodiment, the light illuminator LP is configured to be attachable to and detachable from the rotary case unit 250. In an embodiment where the light illuminator is attached with an adhesive to the rotary case unit, for example, the light illuminator may not have to be configured to be attachable to and detachable from the rotary case unit.

(5) In the above-described embodiment, the light illuminator LP defines the outer shape of the rotary part 20 together with the rotary case unit 250. Meanwhile, the light illuminator may have a shape projecting from the outer surface of the rotary case unit toward the gripping part, for example.

(6) In the above-described embodiment, while the bottom wall unit 217 is attached to the housing unit 216A, the bottom wall unit 217 closes a part of the one end portion 216h of the housing unit 216A. While the bottom wall unit is attached to the housing unit, the bottom wall unit may close the opening entirely at the one end portion of the housing unit in response to the shape of the connector, for example. The bottom wall unit closes at least a part of the one end portion of the housing unit.

B2. Other Embodiments 2

(1) In the above-described embodiment, the housing unit 216A includes the first rail part 216b to the third rail part 216d, the substrate 212 includes the first rail receiver, the lens mount 214 includes the second rail receiver, and the lens cover 215 includes the third rail receiver. For example, the housing unit may not have to include the first rail part to the third rail part, the substrate may not have to include the first rail receiver, the lens mount may not have to include the second rail receiver, and the lens cover may not have to include the third rail receiver.

(2) For example, the housing unit may include a fourth rail part facing the third rail part in addition to the first rail part to the third rail part, the substrate may include the first rail receiver that receives the fourth rail part, the lens mount may include the second rail receiver that receives the fourth rail part, and the lens cover may include the third rail receiver that receives the fourth rail part.

(3) For example, the housing unit may include only the first rail part, the substrate may include only the first rail receiver that receives the first rail part, the lens mount may include only the second rail receiver that receives the first rail part, and the lens cover may include only the third rail receiver that receives the first rail part.

(4) In the above-described embodiment, the first rail part 216b to the third rail part 216d have substantially rectangular solid shapes. Meanwhile, the first rail part to the third rail part may have shapes conforming to the shapes of the first rail receiver to the third rail receiver, for example.

(5) In the above-described embodiment, when viewed in the contact direction, the first rail receiver to the third rail receiver are formed into triangular shapes. Meanwhile, when viewed in the contact direction, the first rail receiver to the third rail receiver may be formed into quadrangular shapes, for example.

B3. Other Embodiments 3

(1) In the above-described embodiment, the light illuminator LP is configured in such a manner that the reference direction and the contact direction are parallel to the optical axis of light emitted from the light-emitting element 211. For example, in the section shown in FIG. 5, the contact direction may be tilted from the reference direction. In this embodiment, the light illuminator may not have to be configured in such a manner that the contact direction is parallel to the optical axis.

(2) For example, the reference direction and the contact direction may be tilted from the optical axis.

The present disclosure is not limited to the embodiments described above and is able to be realized with various configurations without departing from the spirit thereof. For example, technical features in the embodiments corresponding to the technical features in the aspects described in the section of SUMMARY are able to be replaced with each other or combined together as necessary in order to solve part or the whole of the problems described previously or to achieve part or the whole of the effects described previously. When the technical features are not described as essential features in the present specification, they are able to be deleted as necessary.

B4. Other Embodiments 4

(1) According to one aspect of the present disclosure, a light illuminator provided in a steering device is provided. The light illuminator comprises: a light-emitting element that emits light to a gripping part of the steering device; a substrate supporting the light-emitting element; a lens that converges the light emitted from the light-emitting element; a lens mount on which the lens is placed; a lens cover that transmits the light therethrough having been passed through the lens; a housing unit that houses the light-emitting element, the substrate, the lens, the lens mount, and the lens cover, the housing unit having an opening at one end portion thereof; and a bottom wall unit configured to be attachable to and detachable from the housing unit, the bottom wall unit closing at least a part of the one end portion of the housing unit while the bottom wall unit is attached to the housing unit. The housing unit does not include a configuration for fixing the position of the lens cover with respect to a predetermined reference direction and includes a housing contact part contacting the lens cover with respect to the reference direction. The lens cover does not include a configuration for fixing the position of the lens mount with respect to the reference direction and includes a lens cover contact part contacting the lens mount with respect to the reference direction. The lens mount does not include a configuration for fixing the position of the substrate with respect to the reference direction and includes a lens mount contact part contacting the substrate with respect to the reference direction. The substrate does not include a configuration for fixing the position of the bottom wall unit with respect to the reference direction and includes a substrate contact part contacting the bottom wall unit with respect to the reference direction. The housing unit includes a housing engagement part formed closer to the one end portion than the other end portion thereof. The bottom wall unit includes a bottom wall engagement part engaged with the housing engagement part. The engagement between the housing engagement part and the bottom wall engagement part fixes the positions of the housing unit and the bottom wall unit relative to each other with respect to the reference direction.

According to the light illuminator of this aspect, the lens cover, the lens mount, and the substrate are combined sequentially in the reference direction, and then the bottom wall unit and the housing unit are engaged with each other. By doing so, it becomes possible to assemble the light illuminator easily without requiring the operator to form engagement or adhesion between the lens cover, the lens, the lens mount, and the substrate. Furthermore, in disassembling the light illuminator, the operator is capable of disassembling the light illuminator into structures easily by releasing the engagement between the bottom wall unit and the housing unit. In comparison to a case where the light illuminator is assembled by combining structures including a lens cover through engagement therebetween, for example, it is possible to reduce the probability of damage of the light illuminator and to suppress increase in operation time during replacement of the light-emitting element.

(2) In the light illuminator of the above aspect, the housing unit may include a rail part projecting from an inner wall of the housing unit and extending in a contact direction that is a direction from the other end portion toward the one end portion, the substrate may include a first rail receiver that is a groove formed in a direction parallel to the contact direction, the first rail receiver receiving a part of the rail part, the lens mount may include a second rail receiver that is a groove formed in a direction parallel to the contact direction, the second rail receiver receiving a part of the rail part, and the lens cover may include a third rail receiver that is a groove formed in a direction parallel to the contact direction, the third rail receiver receiving a part of the rail part.

According to the light illuminator of this aspect, the rail part is fitted to the first, second, and third rail receivers. This makes it possible to reduce the probability that the positions of the lens cover, the lens mount, and the substrate will be deviated in the housing unit.

(3) In the light illuminator of the above aspect, the reference direction and the contact direction may be parallel to the optical axis of the light emitted from the light-emitting element.

According to the light illuminator of this aspect, the operator is capable of combining the lens cover, the lens mount, and the substrate along the optical axis of the light without causing positional deviations thereof. It is possible to reduce the probability that the light illuminator will be combined with the housing unit by the operator with the optical axis deviating from an intended direction.

(4) According to another aspect of the present disclosure, a steering device is provided. The steering device comprises the light illuminator according to any one of the first to third aspects described above.

The present disclosure is feasible in various aspects other than the light illuminator or the steering device. For example, the present disclosure is feasible in aspects including a method of manufacturing a light illuminator or a steering device, a vehicle mounted with a light illuminator or a steering device, and others.

What is claimed is:

1. A light illuminator provided in a steering device, comprising:
   a light-emitting element that emits light to a gripping part of the steering device;
   a substrate supporting the light-emitting element;
   a lens that converges the light emitted from the light-emitting element;
   a lens mount on which the lens is placed;
   a lens cover that transmits the light therethrough having been passed through the lens;
   a housing unit that houses the light-emitting element, the substrate, the lens, the lens mount, and the lens cover, the housing unit having an opening at one end portion thereof; and
   a bottom wall unit configured to be attachable to and detachable from the housing unit, the bottom wall unit closing at least a part of the one end portion of the housing unit while the bottom wall unit is attached to the housing unit, wherein the housing unit does not include a configuration for fixing a position of the lens cover with respect to a predetermined reference direction and includes a housing contact part contacting the lens cover with respect to the reference direction, the lens cover does not include a configuration for fixing a position of the lens mount with respect to the reference direction and includes a lens cover contact part contacting the lens mount with respect to the reference direction, the lens mount does not include a configuration for fixing a position of the substrate with respect to the reference direction and includes a lens mount contact part contacting the substrate with respect to the reference direction, the substrate does not include a configuration for fixing a position of the bottom wall unit with respect to the reference direction and includes a substrate contact part contacting the bottom wall unit with respect to the reference direction, the housing unit includes a housing engagement part formed closer to the one end portion than an other end portion thereof, the bottom wall unit includes a bottom wall engagement part engaged with the housing engagement part, and the engagement between the housing engagement part and the bottom wall engagement part fixes the positions of the housing unit and the bottom wall unit relative to each other with respect to the reference direction.

2. The light illuminator according to claim 1, wherein the housing unit includes a rail part projecting from an inner wall of the housing unit and extending in a contact direction that is a direction from the other end portion toward the one end portion, the substrate includes a first rail receiver that is a groove formed in a direction parallel to the contact direction, the first rail receiver receiving a part of the rail part, the lens mount includes a second rail receiver that is a groove formed in a direction parallel to the contact direction, the second rail receiver receiving a part of the rail part, and the lens cover includes a third rail receiver that is a groove formed in a direction parallel to the contact direction, the third rail receiver receiving a part of the rail part.

3. The light illuminator according to claim 2, wherein the reference direction and the contact direction are parallel to the optical axis of the light emitted from the light-emitting element.

4. A steering device comprising the light illuminator according to claim 1.

* * * * *